(12) United States Patent
Burtscher et al.

(10) Patent No.: US 10,286,459 B2
(45) Date of Patent: May 14, 2019

(54) MACHINING TOOL (71) Applicant: CERATIZIT AUSTRIA GESELLSCHAFT M.B.H., Reutte (AT)

(72) Inventors: Peter Burtscher, Haeselgehr (AT); Josef Prast, Pflach (AT)

(73) Assignee: CERATIZIT Austria Gesellschaft m.b.H., Reutte (AT)

( * ) Notice: Subject to any disclaimer, the term of this patent is extended or adjusted under 35 U.S.C. 154(b) by 81 days.

(21) Appl. No.: 15/519,566

(22) PCT Filed: Nov. 23, 2015

(86) PCT No.: PCT/AT2015/000149
§ 371 (c)(1),
(2) Date: Apr. 17, 2017

(87) PCT Pub. No.: WO2016/081964
PCT Pub. Date: Jun. 2, 2016

(65) Prior Publication Data
US 2017/0239736 A1    Aug. 24, 2017

(30) Foreign Application Priority Data

Nov. 24, 2014 (AT) ................. GM406/2014

(51) Int. Cl.
*B23C 5/22* (2006.01)
*B23C 5/10* (2006.01)
*B23B 27/16* (2006.01)

(52) U.S. Cl.
CPC ............ *B23C 5/109* (2013.01); *B23C 5/2208* (2013.01); *B23B 27/1662* (2013.01); *B23B 2205/045* (2013.01); *B23C 2210/165* (2013.01)

(58) Field of Classification Search
CPC . B23C 2210/165; B23C 5/109; B23C 5/2208; B23B 2205/045; B23B 27/1662
See application file for complete search history.

(56) References Cited

U.S. PATENT DOCUMENTS

| 2,418,960 | A | * | 4/1947 | Todd | ................ F16B 23/0015 407/56 |
| 3,284,874 | A | * | 11/1966 | Green | ............... B23B 27/1662 407/104 |

(Continued)

FOREIGN PATENT DOCUMENTS

| EP | 0037554 A1 | 10/1981 |
| EP | 0269918 A2 | 6/1988 |

(Continued)

*Primary Examiner* — Sara Addisu
(74) *Attorney, Agent, or Firm* — Laurence A. Greenberg; Werner H. Stemer; Ralph E. Locher (57) ABSTRACT

A tool for machining has a main body, a seat formed on the main body, a fastening screw, and a cutting insert. The seat has a base surface for supporting an underside of the cutting insert and a lateral bearing surface. A bore for receiving the fastening screw is formed in the base surface, the bore has a threaded bore portion and, closer toward the base surface, a thread-free bore portion. The cutting insert is fastened to the seat such that the head portion of the fastening screw is supported on the through-hole in the cutting insert. The threaded portion of the fastening screw engages with the threaded bore and the fastening screw is elastically deflected such that a thread-free shank portion bears against the thread-free bore portion on a side remote from the lateral bearing surface and is spaced apart from the thread-free bore portion.

12 Claims, 6 Drawing Sheets

(56) References Cited

U.S. PATENT DOCUMENTS

| | | | | |
|---|---|---|---|---|
| 3,341,920 A | * | 9/1967 | Kelm | B23B 27/1614 407/101 |
| 3,341,921 A | * | 9/1967 | Weller | B23B 27/1614 407/104 |
| 3,488,822 A | * | 1/1970 | Jones | B23B 27/1662 407/105 |
| 3,525,136 A | * | 8/1970 | Crosby | B23B 27/1662 407/101 |
| 3,540,102 A | | 11/1970 | Yogus et al. | |
| 3,654,682 A | * | 4/1972 | Newbould | B23B 27/1662 407/104 |
| 3,740,807 A | * | 6/1973 | Getts | B23B 27/1662 407/101 |
| 3,805,351 A | * | 4/1974 | Mayer | B23C 5/2208 407/40 |
| 3,913,197 A | * | 10/1975 | Wolf | B23C 5/2221 407/47 |
| 3,925,868 A | * | 12/1975 | Singh | B23B 27/1662 407/103 |
| 3,946,473 A | * | 3/1976 | Petersen | B23B 27/1662 407/105 |
| 4,283,163 A | * | 8/1981 | Grafe | B23B 27/1662 407/104 |
| 4,398,853 A | * | 8/1983 | Erickson | B23B 27/1622 407/104 |
| 4,427,322 A | * | 1/1984 | Kroll | B23B 27/1662 407/105 |
| 4,430,031 A | * | 2/1984 | Hellstrom | B23B 27/1614 407/104 |
| 4,487,533 A | * | 12/1984 | Wermeister | B23B 27/1662 407/105 |
| 4,875,812 A | * | 10/1989 | Hague | B23B 27/065 407/104 |
| 5,004,378 A | * | 4/1991 | Arai | B23B 27/1662 407/101 |
| 5,035,544 A | * | 7/1991 | Ikenaga | B23B 27/1677 407/105 |
| 5,199,828 A | * | 4/1993 | Forsberg | B23B 27/1662 407/104 |
| 5,542,793 A | * | 8/1996 | Deiss | B23C 5/109 407/104 |
| 6,158,928 A | * | 12/2000 | Hecht | B23B 27/1622 407/102 |
| 6,709,204 B2 | * | 3/2004 | Hellstrom | B23B 27/1662 407/102 |
| 7,578,638 B2 | * | 8/2009 | Hessman | B23B 27/16 407/13 |
| 7,625,156 B2 | * | 12/2009 | Pantzar | B23C 5/006 407/34 |
| 7,806,632 B2 | * | 10/2010 | Fouquer | B23C 5/2208 407/104 |
| 8,573,900 B1 | * | 11/2013 | Hecht | B23B 27/045 407/105 |
| 2008/0193233 A1 | * | 8/2008 | Park | B23C 5/2208 407/104 |
| 2009/0092451 A1 | * | 4/2009 | Harif | B23B 27/12 407/33 |
| 2012/0082521 A1 | * | 4/2012 | Burtscher | B23B 27/1662 407/103 |
| 2013/0004252 A1 | | 1/2013 | Yoshioka | |
| 2016/0288215 A1 | * | 10/2016 | Harif | B23B 27/1614 |

FOREIGN PATENT DOCUMENTS

| | | |
|---|---|---|
| EP | 1283082 A1 | 2/2003 |
| GB | 2041797 A | 9/1980 |
| JP | S57102704 A | 6/1982 |
| JP | H0760528 A | 3/1995 |
| RU | 2012143148 A | 4/2014 |
| SU | 1255305 A1 | 9/1986 |
| SU | 1750853 A1 | 7/1992 |
| WO | 9739849 A1 | 10/1997 |

* cited by examiner

MACHINING TOOL

BACKGROUND OF THE INVENTION

Field of the Invention

The present invention relates to a tool for machining, having a main body that determines an axis of rotation about which the tool rotates in operation, at least one seat, formed on the main body, for receiving an exchangeable cutting insert, a fastening screw for fastening the cutting insert to the seat, and a cutting insert fastened to the seat.

In the machining of in particular metal materials, use is frequently made of tools which have a main body made from a relatively tough material, in particular tool steel, and one or more cutting inserts, fastened to the main body, that are made from a hard and wear-resistant material, in particular cemented carbide, cermet or a cutting ceramic. The main body is in this case configured to be fastened to a machine tool, such as in particular a milling machine or a machining center, and the cutting insert or cutting inserts is/are fastened to the main body in such a way as to come into engagement with the workpiece to be machined during machining. The cutting inserts are usually fastened to the main body in an exchangeable manner, for example via fastening screws, such that if the cutting edges that come into engagement with the workpiece become worn, only the cutting inserts need to be exchanged.

In particular for machining by milling, tools are known in which a plurality of cutting inserts are arranged in corresponding seats on the main body in an arrangement extending substantially spirally around the axis of rotation of the main body. In such tools, often referred to as "porcupine cutters", it is possible, for example, for a row of cutting inserts to extend spirally around the main body, or it is also possible, for example, for a plurality of rows of cutting inserts to extend spirally around the main body. In order to remove the chips that arise during the machining of a workpiece, the main body of such a tool is usually provided with one or more chip spaces which can, in particular, extend for example likewise substantially spirally along the main body. In particular in the case of a large number of cutting inserts arranged on the main body, it is increasingly difficult to simultaneously ensure reliable and exact positioning of the cutting inserts and good removal of the arising chips.

In conventional tools of this type, in which the seat for the cutting insert has, in addition to the base surface for supporting the underside of the cutting insert, both a lateral bearing surface for positioning the cutting insert with regard to the radial direction and a lateral bearing face for positioning the cutting insert with regard to the axial direction, it is difficult to reconcile good chip removal and desired relative positioning of a plurality of cutting inserts with one another. This problem occurs to an even greater extent particularly in cutting inserts which protrude from the main body in the axial direction.

The directional indications "axial", "radial" and "tangential" are used, in the context of the present description, with regard to the axis of rotation of the tool, unless a different reference becomes expressly apparent from the specific context.

U.S. Pat. No. 5,542,793 describes a tool main body in which a seat for an exchangeable cutting insert is formed such that the cutting insert is supported only with its underside on a main surface of the seat and with a side face on a lateral bearing surface for radial positioning. The cutting insert is positioned in an axial direction of the main body via the engagement of a fastening screw with a corresponding bore in the seat, wherein the dimensions of the fastening screw and the dimensions of the bore are coordinated exactly with one another in order to achieve precise orientation in the axial direction by a form fit. The required exact dimensioning and coordination of the fastening screw and the bore is associated with high production costs, relatively susceptible to occurring wear and is sensitive to production tolerances of the cutting insert.

SUMMARY OF THE INVENTION

The object of the present invention is to provide an improved tool for machining.

The object is achieved by a tool for machining as claimed in claim 1. Advantageous developments are specified in the dependent claims.

The tool has a main body that determines an axis of rotation about which the tool rotates in operation, at least one seat, formed on the main body, for receiving an exchangeable cutting insert, a fastening screw for fastening the cutting insert to the seat, and a cutting insert fastened to the seat. The seat has a base surface for supporting an underside of the cutting insert and a lateral bearing surface for a side face of the cutting insert to bear against. A bore for receiving the fastening screw is formed in the base surface. The bore has a threaded bore at a distance from the base surface and, closer toward the base surface, a thread-free bore portion. The fastening screw has a threaded portion for engaging with the threaded bore, a head portion to be supported in a through-hole in the cutting insert, and a thread-free shank portion between the threaded portion and the head portion. The thread-free shank portion has a smaller cross section than the thread-free bore portion. The cutting insert is fastened to the seat in such a way that the head portion of the fastening screw is supported on the through-hole in the cutting insert, the threaded portion of the fastening screw engages with the threaded bore and the fastening screw is elastically deflected in such a way that the thread-free shank portion bears against the thread-free bore portion on a side remote from the lateral bearing surface and is spaced apart from the thread-free bore portion on a side facing the lateral bearing surface.

The tool can be in particular a milling tool having a plurality of cutting inserts fastened to corresponding seats. In this case, it is possible for example for all of the cutting inserts to be fastened to the respective seats in the specified manner, or it is also possible for example for only those cutting inserts which protrude from the main body in the axial direction to be fastened to the seats associated therewith in the specified manner. Since the thread-free shank portion has a smaller cross section than the thread-free bore portion, i.e. the thread-free bore portion has an oversize all the way around the thread-free shank portion, said oversize being much greater than the production tolerances that arise, when the fastening screw for fastening the cutting insert to the seat is tightened, free mobility of the thread-free shank portion is allowed both in the axial direction and in the radial direction. This oversize allows cost-effective production of the seat and of the bore formed therein, since relatively large production tolerances are allowed. Since, when the cutting insert is fastened to the seat, the fastening screw is elastically deflected in such a way that the thread-free shank portion bears against the thread-free bore portion on a side remote from the lateral bearing surface, the position of the cutting insert in the direction parallel to the lateral bearing surface is fixed via the position and shape of this side of the thread-free bore portion. During the elastic deflection of the fastening screw, the cutting insert is oriented on the seat in this way. When the lateral bearing surface extends for example as a radial bearing surface substantially parallel to the axis of rotation, the axial position of the cutting insert is thus fixed by the engagement of the thread-free shank portion with the thread-free bore portion. If, on the other hand,—in another embodiment—the lateral bearing surface extends for example as an axial bearing surface substantially perpendicularly to the axis of rotation, the radial position of the cutting insert is fixed by the engagement. The lateral bearing surface can thus have different orientations relative to the axis of rotation. The configuration according to the invention of the fastening of the cutting insert is very cost-effective to produce, relatively insensitive to production tolerances and wear phenomena and nevertheless allows the cutting insert to be positioned reliably with regard to two spatial directions via the base surface and the lateral bearing surface and with regard to the third spatial direction via the engagement of the head portion of the fastening screw with the through-bore in the cutting insert or of the thread-free shank portion with the thread-free bore portion.

According to one development, the cutting insert is oriented in a direction which extends perpendicularly to a surface normal of the lateral bearing surface and perpendicularly to a surface normal of the base surface by the engagement of the head portion of the fastening screw with the through-hole in the cutting insert. In other words, the cutting insert is not fixed in the third spatial direction via any bearing against a further lateral bearing surface, but rather— on account of the configuration of the thread-free shank portion and the thread-free bore portion—only via the engagement of the head portion with the through-hole. Since no bearing surface is thus required with regard to the third spatial direction, there is considerable design freedom for the arrangement of a plurality of cutting inserts on the main body and sufficient space for reliable chip removal can be provided.

According to one development, the thread-free bore portion has a concavely curved shape on the side remote from the lateral bearing surface. In this case, when the cutting insert is fastened to the seat, the thread-free shank portion of the fastening screw reliably moves into that region of the thread-free bore portion that is farthest away from the lateral bearing surface. Thus, the cutting insert is reliably oriented during fastening. For the shape of the thread-free bore portion there is in this case a relatively large amount of design freedom. In particular, the shape of the thread-free bore portion on the side facing the lateral bearing surface is relatively unimportant. The thread-free bore portion can have for example a circular cross section with a diameter which is much greater than the diameter of the thread-free shank portion, be in the form of a slot or else be designed in some other way.

According to one development, the thread-free bore portion is wider, in a direction parallel to the bearing surface and perpendicular to a longitudinal axis of the fastening screw, than the diameter of the thread-free shank portion of the fastening screw. In this case, there is sufficient lateral clearance, which significantly exceeds the production tolerances that arise, of the thread-free shank portion in the thread-free bore portion, such that not only is cost-effective production allowed but also the thread-free shank portion can move reliably in the thread-free bore portion in order to orient the cutting insert.

According to one development, a surface normal of the lateral bearing surface is oriented predominantly perpendicularly to the axis of rotation. In this case, the lateral bearing surface is formed as a radial bearing surface, i.e. for support with respect to forces acting radially inward. This configuration allows a good chip-space design in particular in the case of a tool having a multiplicity of spirally arranged cutting inserts.

According to one development, the thread-free bore portion has a substantially circular cross section. This configuration allows particularly cost-effective production of the thread-free bore portion by boring. The circular cross section has in this case a considerable oversize compared with the cross section of the thread-free shank portion of the fastening screw.

According to one development, the thread-free bore portion is formed parallel to the threaded bore. In principle, the thread-free bore portion can also have a different orientation, but the parallel formation allows particularly cost-effective production. Preferably, the thread-free bore portion can be formed coaxially with the threaded bore.

When the seat is free of a further bearing surface in a direction perpendicular to the lateral bearing surface and the base surface, the components or elements for positioning the cutting insert take up particularly little space.

According to one development, that region of the head portion of the fastening screw that is supported on the through-hole in the cutting insert narrows in the direction of the threaded portion. In this case, particularly reliable positioning of the cutting insert is allowed.

According to one development, a longitudinal axis of the threaded bore is offset toward the lateral bearing surface with respect to the longitudinal axis of the through-hole, in the plane of contact between the head portion of the fastening screw and the through-hole in the cutting insert. In this case, the cutting insert is not only clamped reliably against the lateral bearing surface but also the elastic deflection of the fastening screw (in particular also of the thread-free shank portion) away from the lateral bearing surface is allowed. In the particular case in which the longitudinal axis of the threaded bore extends parallel to the longitudinal axis of the through-hole, the longitudinal axis of the threaded bore is offset overall with respect to the longitudinal axis of the through-hole. In the event that the longitudinal axis of the threaded bore does not extend parallel to the longitudinal axis of the through-hole, however, it is important that the offset is at least provided in the plane in which the head portion of the fastening screw comes into contact with the through-hole.

According to one development, the seat is formed in such a way that the cutting insert fastened therein protrudes from the main body in an axial direction. In the case of cutting inserts that are arranged in a manner protruding in an axial direction from the main body, the difficulty of good chip removal is very pronounced, in particular in the case of milling cutters having a plurality of cutting inserts arranged spirally around the axis of rotation.

According to one development, the tool has a plurality of seats, arranged spirally along the axis of rotation, for cutting inserts. Preferably, the tool can have a plurality of spirally encircling rows of seats for cutting inserts.

Further advantages and expedient aspects of the invention can be gathered from the following description of exemplary embodiments with reference to the appended figures.

DESCRIPTION OF THE INVENTION

An embodiment is described in more detail in the following text with reference to FIG. 1 to FIG. 9.

Figure 1:
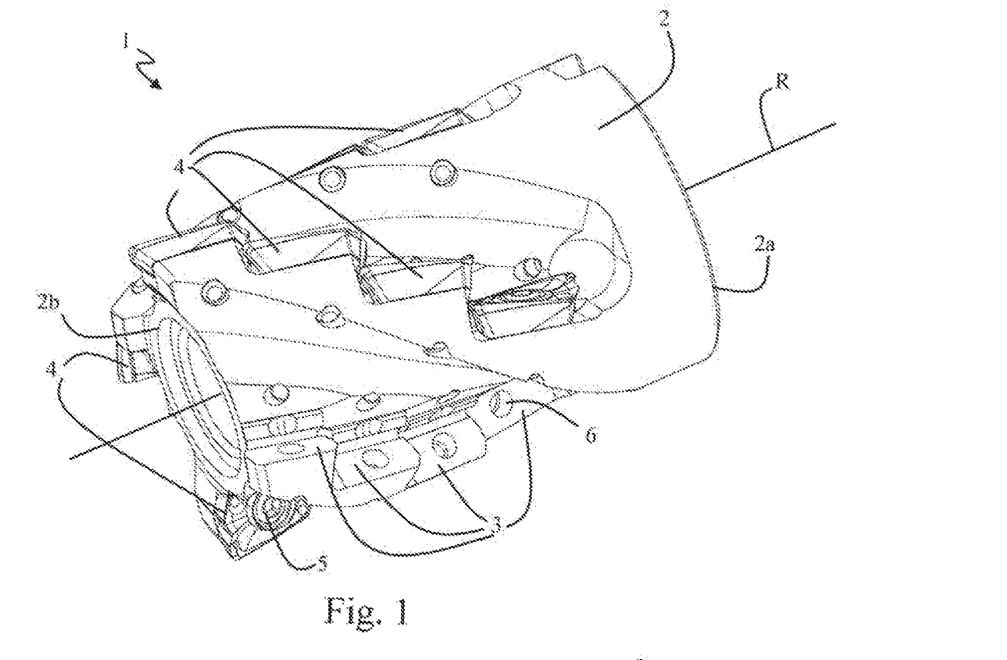
FIG. 1: shows a perspective illustration of a tool for machining according to an embodiment in which only some of the seats for cutting inserts are fitted with cutting inserts.
Figure 2:
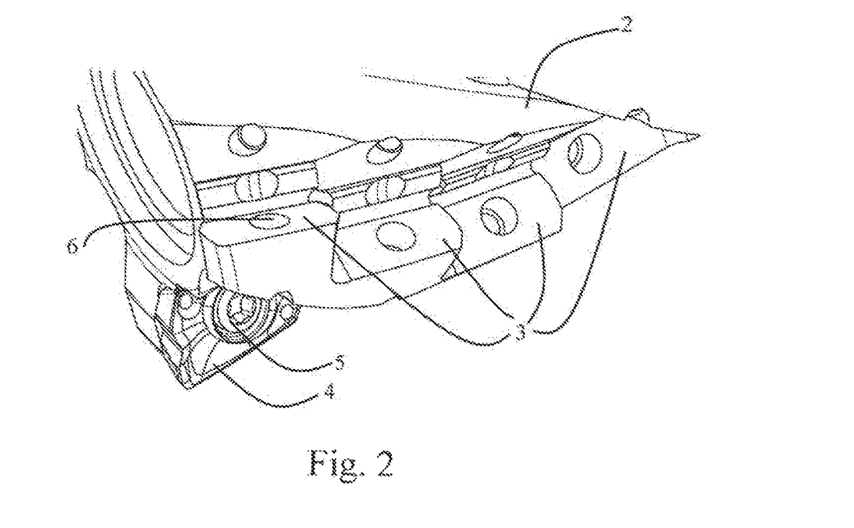
FIG. 2: shows an enlarged illustration of a detail of FIG. 1.

FIG. 1 shows a perspective illustration of a tool 1 for machining according to the embodiment. The tool 1 is in the form of a milling tool in the embodiment.

However, it should be noted that the solution according to the invention can also be used in other tools, in particular boring or turning tools.

The tool 1 according to the embodiment has a main body 2 with a plurality of seats 3, arranged spirally around an axis of rotation R of the main body 2, for receiving exchangeable cutting inserts 4. The main body 2 is configured to be connected at a first end 2a to a machine tool, in particular a milling machine, and to rotate about the axis of rotation R in operation. The second end 2b, remote from the first end 2a, forms a free end which faces the workpiece to be machined during operation.

In the exemplary embodiment illustrated specifically in the figures, the tool 1 is in the form of what is known as a porcupine cutter, in which a plurality of rows of seats 3 for receiving cutting inserts 4 are provided in a manner spirally encircling the axis of rotation. However, it should be noted that this configuration is not compulsory, and the described solution can also be used in other tools.

The main body 2 is produced from a relatively tough material and can be made for example in particular from tool steel. The cutting inserts 4 are formed from a much harder material and are configured to come into engagement with the workpiece to be machined during machining. The cutting inserts can in this case be made in particular in a manner known per se from cemented carbide, cermet or a cutting ceramic. The cutting inserts 4 are fastened to the respective seats 3 via fastening screws 5, as is described in more detail in the following text.

In the exemplary embodiment described in more detail in the following text, all of the cutting inserts 4 are arranged in substantially the same way on the associated seats 3, and so the manner of fastening is described in detail only for one of the seats 3 in the following text. Although, in the specific exemplary embodiment, fastening takes place in substantially the same way for all the cutting inserts 4, it is for example also possible in principle to fasten some of the cutting inserts in some other way. In this case, however, the manner of fastening, as described in the following text, is particularly advantageous in particular also for fastening the cutting inserts 4 which protrude from the free end 2b of the main body 2 with one cutting edge in the axial direction. The axial direction should be understood here as meaning the direction which extends parallel to the axis of rotation R.

The configuration of the seats 3 is described in more detail in the following text with reference to FIG. 3, using the example of a seat 3 which is located at the free end 2b of the main body 2.

Figure 3:
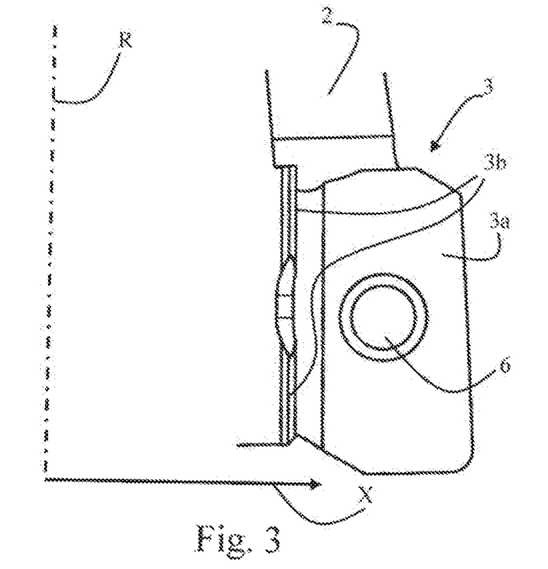
FIG. 3: shows an enlarged illustration of a seat for receiving an exchangeable cutting insert.

As can be seen in FIG. 3, the seat 3 has a base surface 3a which is configured to support an underside of the cutting insert 4. In the exemplary embodiment illustrated specifically in the figures, the base surface 3a in this case extends approximately perpendicularly to a tangential direction, such that the cutting forces that arise during machining are introduced mainly into the base surface 3a. Formed in the base surface 3a is a bore 6 for receiving a lower part of the fastening screw 5, which is described in more detail in the following text.

As can likewise be seen in FIG. 3, the seat 3 also has a lateral bearing surface 3b, which extends transversely to the base surface 3a and is configured for a side face of the cutting insert 4 to bear against. The lateral bearing surface 3b can extend for example substantially perpendicularly to the base surface 3a, but an arrangement at a different angle is also possible. As can be seen in FIG. 3, the lateral bearing surface 3b is subdivided into two part surfaces by an interruption in the exemplary embodiment, but a contiguous configuration of the lateral bearing surface 3b is also possible.

The seat 3 is configured to receive the cutting insert 4 such that the cutting insert 4 is supported on the seat 3 only with the underside and one of its side faces. Therefore, the seat 3 is free of a further lateral bearing surface for supporting a further side face of the cutting insert 4. On account of this configuration, the cutting insert 4 is oriented and fixed with regard to two spatial directions on the seat 3 via the base surface 3a and the lateral bearing surface 3b. Orientation and fixing with regard to the remaining third spatial direction takes place via the engagement of the fastening screw 5 with a through-hole 7 in the cutting insert 4 and the bore 6 formed in the base surface 3a, as will be explained in more detail.

In the exemplary embodiment illustrated, the lateral bearing surface 3b is configured as a radial bearing surface for supporting the cutting insert 4 with respect to forces acting in a radial direction X and thus extends mainly perpendicularly to the radial direction X. Such an orientation is advantageous in the milling tool specifically illustrated. However, it should be noted that the lateral bearing surface 3b can also have a different orientation, for example can also be configured in particular to support the cutting insert with respect to forces acting in an axial direction, and so it can extend for example substantially perpendicularly to the axial direction. However, other orientations of the lateral bearing surface 3b are also possible in addition to these very specific orientations.

In the following text, the fastening screw 5 is described in more detail with reference to FIG. 4.

The fastening screw 5 has a threaded portion 5a, a head portion 5b and a thread-free shank portion 5c arranged between the threaded portion 5a and the head portion 5b. The head portion 5b is provided at its free end with a structure for engaging with a screwing tool in order to allow actuation of the fastening screw 5. Although a hexagonal recess is schematically illustrated as such a structure in FIG. 4, other configurations that can be found in the prior art are also possible. The threaded portion 5a is configured to engage with a corresponding region, configured as a threaded bore 6a, of the bore 6 in the seat 3. On its side facing the threaded portion 5a, the head portion 5b has a shape that narrows in the direction of the threaded portion 5a and is configured to engage with the through-hole 7 in the cutting insert 5. A conical configuration is possible, for example.

Figure 4:
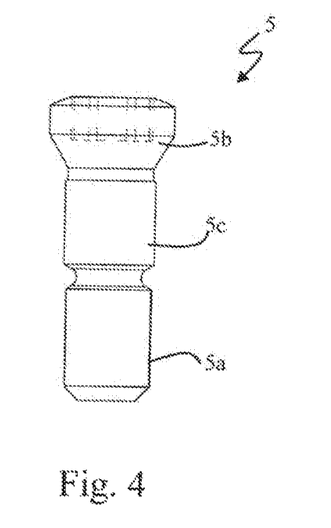
FIG. 4: shows a side view of a fastening screw.

The thread-free shank portion 5c has a substantially circular-cylindrical configuration, as can be seen in FIG. 4. Although the thread-free shank portion 5c has, in the embodiment, a cross section which is somewhat larger than the cross section of the threaded portion 5a, the thread-free shank portion 5c can also have for example a smaller diameter. In the embodiment illustrated, an encircling groove is formed between the threaded portion 5a and the thread-free shank portion 5c, said groove enhancing elastic deflectability of the fastening screw 5 in a direction perpendicular to its longitudinal axis. However, it should be noted that such a groove is not absolutely necessary.

Next, the configuration of the bore 6 formed in the base surface 3a of the seat 3 will be described in more detail.

Figure 5:
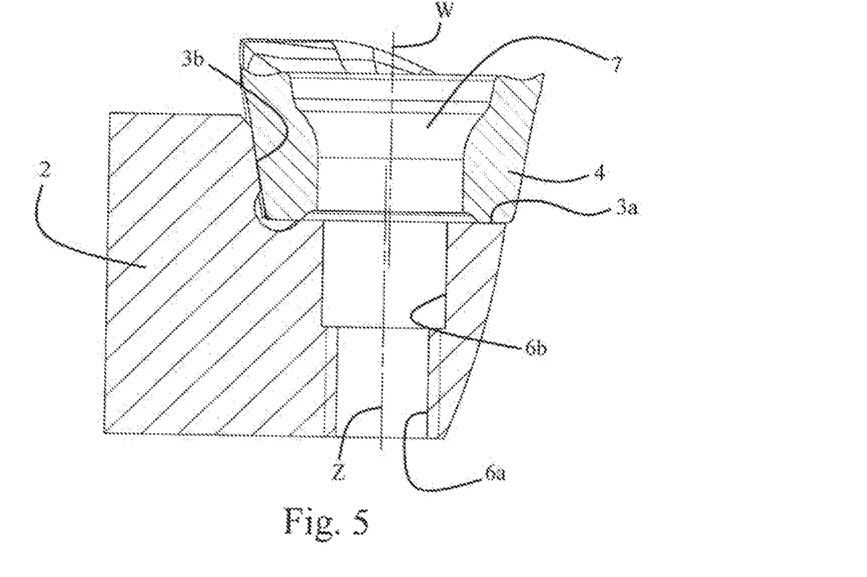
FIG. 5: shows a schematic sectional illustration of a seat with a cutting insert arranged thereon, without a fastening screw.

As can be seen in particular in FIG. 5, the bore 6 has, in a region away from the base surface 3a of the seat 3, a threaded bore 6a which is adapted to the threaded portion 5a of the fastening screw 5. Closer toward the base surface 3a of the seat 3, the bore 6 has a thread-free bore portion 6b which has a greater cross section, in the direction perpendicular to the bore axis, then the threaded bore 6a. In the embodiment illustrated, the threaded bore 6a transitions into the thread-free bore portion 6b via a step. Although, with regard to the embodiment, a bore 6 is shown which extends from the base surface 3a through the material of the main body 2 and is likewise configured in an open manner on the rear side, thereby allowing particularly easy production, the bore 6 can also be formed in a closed manner at the end remote from the base surface 3a.

In the embodiment, the bore 6 extends, over its entire depth, substantially perpendicularly to the base surface 3a of the seat 3. In a variant, it is also possible, however, for the bore 6 to be formed in a manner extending obliquely to the base surface 3a. Furthermore, it is also possible, for example, for a longitudinal axis of the threaded bore 6a and a longitudinal axis of the thread-free bore portion 6b to be configured in an offset manner with respect to one another and/or to extend at an angle to one another. A parallel and in particular coaxial configuration of the threaded bore 6a and of the thread-free bore portion 6b allows particularly cost-effective production, however.

In the direction perpendicular to the longitudinal axis of the threaded bore 6a, the thread-free bore portion 6b has a cross section which is much greater than the cross section of the thread-free shank portion 5c of the fastening screw, such that the thread-free shank portion 5c is able to be received in the thread-free bore portion 6b with a clearance all the way round. In the exemplary embodiment, the thread-free bore portion 6b has for example a round cross-sectional shape which is provided with a considerable oversize compared with the thread-free shank portion 5b, said oversize significantly exceeding the magnitude of conventional tolerances. This ensures that, in the event of elastic deformation of the fastening screw 5, the thread-free shank portion 5c can move in the thread-free bore portion 6b in the directions perpendicular to the longitudinal axis of the fastening screw 5. For the particular case of a coaxial configuration of the threaded bore 6a and the thread-free bore portion 6b and of a circular cross section of the thread-free bore portion 6b, this is illustrated in FIG. 8a). It can be seen that the thread-free shank portion 5c has a clearance around its entire circumference in the thread-free bore portion 6b. The thread-free bore portion 6b (also) has a concave shape on its side remote from the lateral bearing surface 3b, the radius of said concave shape being greater than the radius of the thread-free shank portion 5c.

As can be seen in FIG. 5, the longitudinal axis Z of the threaded bore 6a is arranged in a manner offset slightly toward the lateral bearing surface 3b with respect to the longitudinal axis W of the through-hole 7 in the cutting insert 4, when the cutting insert 4 is located in the seat 3. In the particular case illustrated of a parallel orientation of the longitudinal axis Z of the threaded bore 6a and the longitudinal axis W of the through-hole 7, this offset is present along the entire extent of the longitudinal axes Z, W. It is also possible, however, for the respective longitudinal axes Z and W to enclose an angle with one another. In this case, the corresponding effect is achieved when the described offset of the longitudinal axis Z of the threaded bore 6a is provided in a height position at which the head portion 5b of the fastening screw 5 comes into contact with the through-hole 7 in the cutting insert 4.

Figure 6:
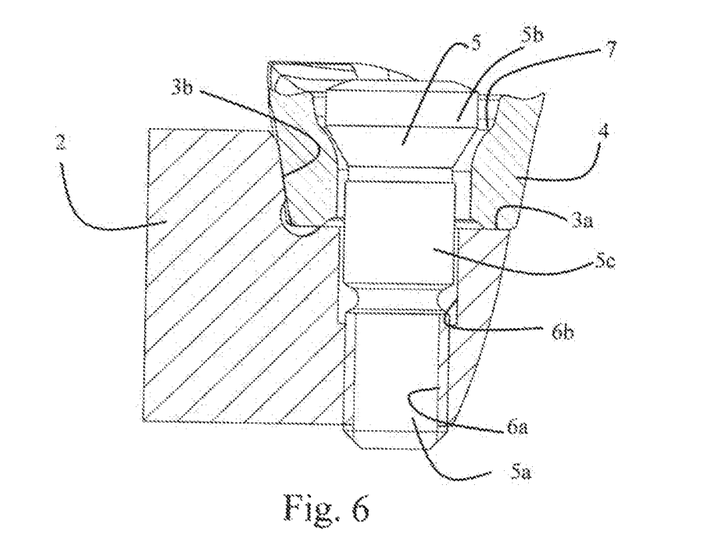
FIG. 6: shows a schematic sectional illustration of a seat with a cutting insert arranged thereon and with a fastening screw in a first state in which the fastening screw has not been tightened.
Figure 7:
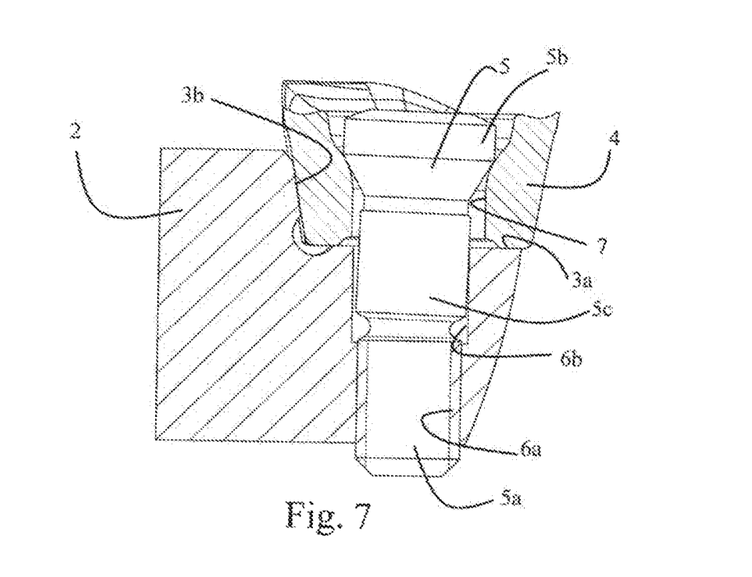
FIG. 7: shows a schematic sectional illustration of the seat with the cutting insert arranged thereon and with the fastening screw in a second state in which the fastening screw has been tightened.
Figure 8:
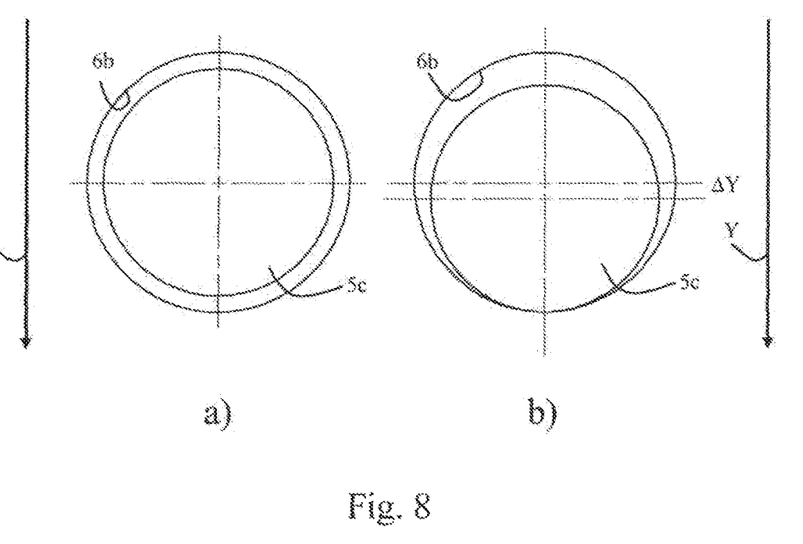
FIG. 8a): shows a schematic illustration of the orientation between a thread-free shank portion of the fastening screw and a thread-free bore portion of the seat in the embodiment in the first state.
FIG. 8b): shows a schematic illustration of the orientation between the thread-free shank portion of the fastening screw and the thread-free bore portion of the seat in the second state.

With reference to FIG. 6 and FIG. 7, a description is now given of how the cutting insert 4 is fastened to the seat 3 by way of the fastening screw 5. FIG. 6 illustrates a first state in which the fastening screw 5 has not yet been tightened. It can be seen that the threaded portion 5a of the fastening screw 5 has been received in the threaded bore 6a and the thread-free shank portion 5c of the fastening screw 5 has a clearance on all sides with respect to the wall of the thread-free bore portion 6b. This first state is also schematically illustrated in FIG. 8a).

When the fastening screw 5 is tightened, the underside of the head portion 5b bears against the surface of the through-hole 7 in the cutting insert 4. On account of the offset of the longitudinal axis Z of the threaded bore 6a with respect to the longitudinal axis W of the through-hole 7, the head portion 5b touches the surface of the through-hole 7 first on the side which faces the lateral bearing surface 3b, such that the upper region of the fastening screw 5 is elastically deflected. In the process, the head portion 5b and the thread-free shank portion 5c are deflected in the direction away from the lateral bearing surface 3b and the cutting insert 4 is pressed against the lateral bearing surface 3b by a side face. While the fastening screw 5 is being tightened, the cutting insert 4 is consequently clamped with its underside against the base surface 3a and with a side face against the lateral bearing surface 3b, such that the cutting insert 4 is fixed with regard to two spatial directions in this way.

Figure 9:
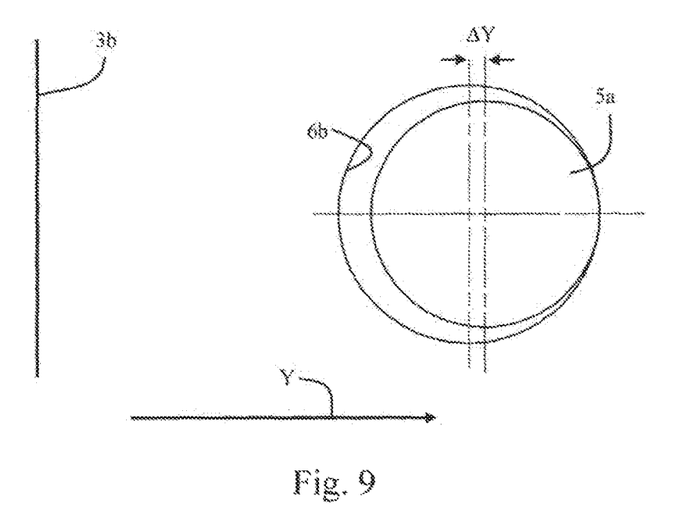
FIG. 9 shows a schematic illustration for explaining the precise orientation of a thread-free shank portion in a thread-free bore portion in the second state in the embodiment.

During the elastic deflection of the fastening screw 5, the thread-free shank portion 5c also moves in the direction Y away from the lateral bearing surface 3b, as is schematically illustrated in FIG. 8b) and FIG. 9. Since the thread-free bore portion 6b has an oversize with respect to the thread-free shank portion 5c, the thread-free shank portion 5c can move by a distance ΔY in the thread-free bore portion 6b. On account of the oversize of the thread-free bore portion 6b in the direction perpendicular to the direction Y and the concavely curved shape of the thread-free bore portion 6b on the side remote from the lateral bearing surface 3b, the thread-free shank portion 5c moves—in a manner guided by the wall of the thread-free bore portion 6b —until it is positioned in that region of the thread-free bore portion 6b that is farthest away from the lateral bearing surface 3b. On account of the concavely curved shape of the thread-free bore portion 6b, the cutting insert 4 is simultaneously oriented and clamped in the third spatial direction (i.e. the spatial direction perpendicular to the surface normal to the lateral bearing surface 3a and perpendicular to the surface normal to the base surface 3b).

In the second state, illustrated in FIG. 8b) and FIG. 9, in which the fastening screw 5 has been tightened, the thread-free shank portion 5c bears against the thread-free bore portion 6b on the side remote from the lateral bearing surface 3b. On the side facing the lateral bearing surface 3b, the thread-free shank portion 5c is spaced apart from the wall of the thread-free bore portion 6b. When the thread-free bore portion 6b and the lateral offset between the longitudinal axis Z of the threaded bore 6a and the longitudinal axis W of the through-hole 7 are designed, care should be taken to ensure that the fastening screw 5 can elastically deform far enough for the thread-free shank portion 5c to bear against the thread-free bore portion 6b on the side remote from the lateral bearing surface 3b in the tightened second state.

Although, with regard to the embodiment, a configuration has been described in which the thread-free bore portion 6b has a cylindrical shape with a substantially circular cross section, this allowing in particular easy and cost-effective production, the shape of the thread-free bore portion 6b is not limited thereto, as is described in the following text by way of example on the basis of a development and two variants.

Development

Figure 12:
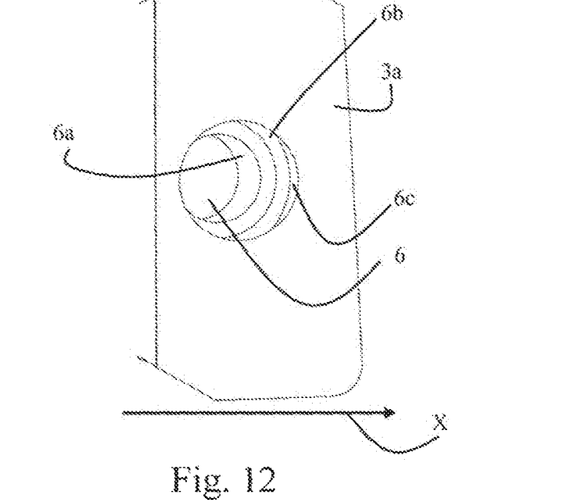
FIG. 12: shows a schematic illustration of the seat 3 in a development of the embodiment.

A development of the embodiment will now be described with reference to FIG. 12 and FIG. 13.

The development differs from the previously described embodiment in that the thread-free bore portion 6b is additionally adapted specifically to the shape of the thread-free shank portion 5c on the side, remote from the lateral bearing surface 3b, against which the thread-free shank portion 5c of the fastening screw 5 bears against the thread-free bore portion 6b in the tightened second state.

According to the development, the thread-free bore portion 6b has, on the side remote from the lateral bearing surface 3b, a contact face 6c on which the thread-free shank portion 5c is supported in the elastically deflected state. The contact face 6c is formed in the wall of the thread-free bore portion 6b as a cylindrical face, the radius of which corresponds substantially to the radius of the thread-free shank portion 5c. The cylinder axis of the contact face 6c is formed in a manner tilted somewhat with respect to the longitudinal axis Z of the threaded bore 6a. In the example specifically illustrated in FIG. 12 and FIG. 13, the cylinder axis of the contact face 6c is tilted for instance at an angle at which the thread-free shank portion 5c is tilted with respect to the threaded portion 5a in the elastically deflected state. The orientation and the radius of the contact face 6c are thus adapted to the radius and the orientation of the thread-free shank portion 5c in the elastically deflected state.

Figure 13:
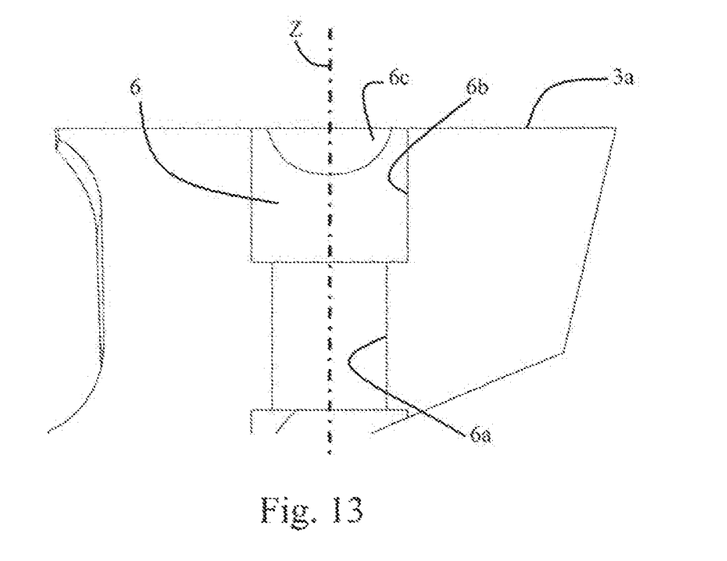
FIG. 13: shows a schematic sectional illustration of the development in FIG. 12.

In the viewing direction, illustrated in FIG. 13, perpendicular to the longitudinal axis Z of the threaded bore 6a, the intersection line can be seen, which results as an intersection line between the tilted cylindrical contact face 6c and the larger-diameter cylindrical face of the rest of the thread-free bore portion 6b.

The development described allows even more precise positioning of the cutting insert 4.

Variants

A first variant of the embodiment is described in the following text on the basis of FIGS. 10a) and 10b).

The first variant differs from the above-described embodiment in that the thread-free bore portion 6b is not formed as a bore with a circular cross section, but rather in the form of a slot.

Figure 10:
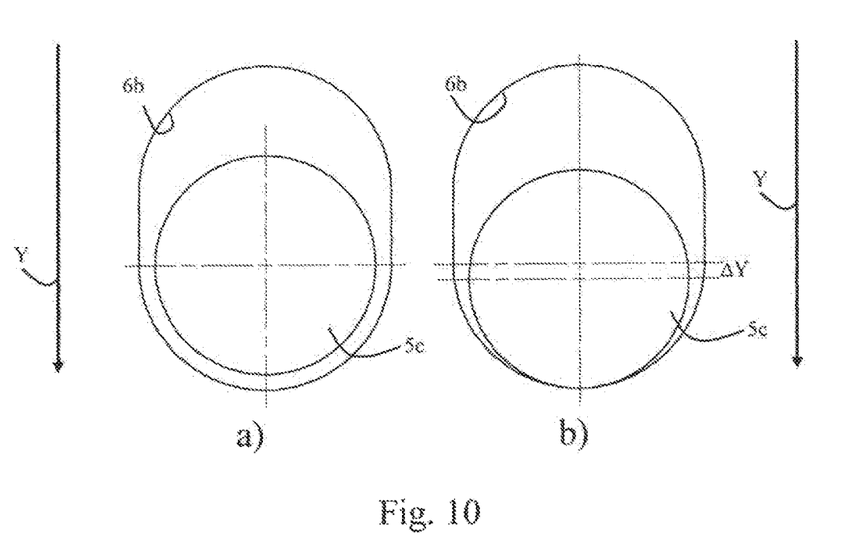
FIG. 10a): shows a schematic illustration corresponding to FIG. 8a) in a first variant in which the thread-free bore portion has a different cross-sectional shape.
FIG. 10b): shows a schematic illustration corresponding to FIG. 8b) in the first variant.

In this variant, too, the thread-free bore portion 6b has an oversize all the way around the thread-free shank portion 5c, such that the thread-free shank portion 5c can move in the directions perpendicular to the longitudinal axis of the fastening screw 5 in the thread-free bore portion 6b, as can be seen in FIG. 10a) for the first state, in which the fastening screw 5 has not yet been tightened. Furthermore, the thread-free bore portion 6b has a concavely curved shape on its side remote from the lateral bearing surface 3b in the variant, too, such that the thread-free shank portion 5c moves into that region of the thread-free bore portion 6b that is farthest away from the lateral bearing surface 3b when the fastening screw 5 is tightened, and thus fixes the cutting insert 4 in a well-defined manner in the third spatial direction.

Figure 11:
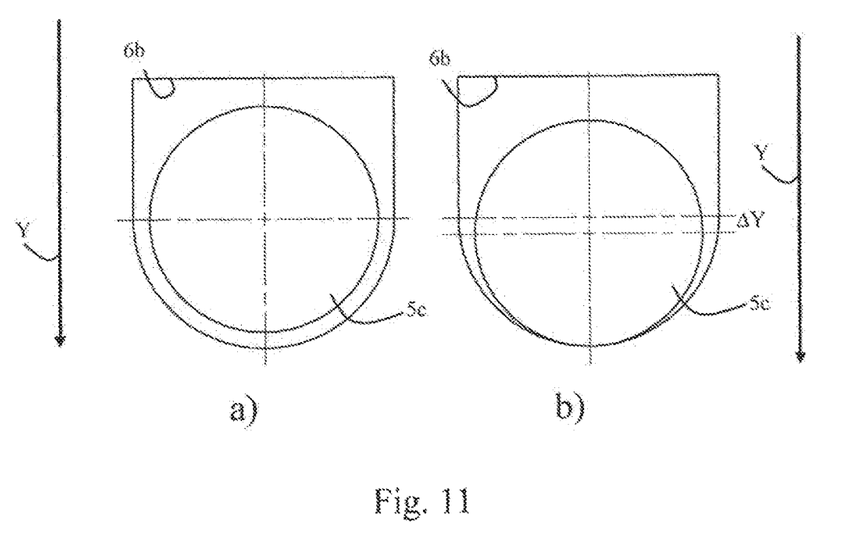
FIG. 11a): shows a schematic illustration corresponding to FIG. 8a) in a second variant in which the thread-free bore portion has yet another cross-sectional shape.
FIG. 11b): shows a schematic illustration corresponding to FIG. 8b) in the second variant.

In the second variant, illustrated in FIG. 11a) and FIG. 11b), the thread-free bore portion 6b likewise has an elongate configuration and is formed in a concavely curved manner on the side remote from the lateral bearing surface 3b. In contrast to the above-described configuration, however, the thread-free bore portion 6b is not configured as a slot in the second variant, in which the side facing the lateral bearing surface 3b is also concavely curved, but rather the side facing the lateral bearing surface 3b extends substantially perpendicularly to the side walls of the thread-free bore portion 6b.

It is immediately apparent that yet further variants in particular also of the shape of the thread-free bore portion 6b are possible. Furthermore, the thread-free bore portion 6b can additionally be provided with a contact face 6c in the variants, too, as was described with reference to the development of the embodiment.

The invention claimed is:

1. A tool for machining, the tool comprising:
   a main body defining an axis of rotation about which the tool rotates in operation;
   an exchangeable cutting insert having a through-hole formed therein and an underside;
   at least one seat, formed on said main body, and receiving said exchangeable cutting insert;
   a fastening screw fastening said exchangeable cutting insert to said seat;
   said seat having a base surface for supporting said underside of said exchangeable cutting insert and a lateral bearing surface for a side face of said exchangeable cutting insert to bear against, said base surface having a bore formed therein receiving said fastening screw, said bore having a threaded bore portion at a distance from said base surface and, closer toward said base surface, a thread-free bore portion;

said fastening screw having a threaded portion for engaging with said threaded bore portion, a head portion to be supported in said through-hole in said exchangeable cutting insert, and a thread-free shank portion between said threaded portion and said head portion, said thread-free shank portion having a smaller cross section than said thread-free bore portion;

said exchangeable cutting insert being fastened to said seat in such a way that said head portion of said fastening screw is disposed in said through-hole in said exchangeable cutting insert, said threaded portion of said fastening screw engaging with said threaded bore portion and said fastening screw is elastically deflected in such a way that said thread-free shank portion bears against said thread-free bore portion on a side remote from said lateral bearing surface and said thread-free shank portion is spaced apart from said thread-free bore portion on a side closest to said lateral bearing surface;

said seat being free of a further bearing surface in a direction perpendicular to said lateral bearing surface and said base surface;

said thread-free bore portion is wider, in a direction parallel to said lateral bearing surface and perpendicular to a longitudinal axis of said fastening screw, than a diameter of said thread-free shank portion of said fastening screw; and said thread-free portion is deflected in a direction away from said lateral bearing surface.

2. The tool according to claim 1, wherein said exchangeable cutting insert is oriented in a direction which extends perpendicularly to a surface normal of said lateral bearing surface and perpendicularly to a surface normal of said base surface by an engagement of said head portion of said fastening screw with said through-hole in said exchangeable cutting insert.

3. The tool according to claim 1, wherein said thread-free bore portion has a concavely curved shape on a side remote from said lateral bearing surface.

4. The tool according to claim 1, wherein a surface normal of said lateral bearing surface is oriented predominantly perpendicularly to the axis of rotation.

5. The tool according to claim 1, wherein said thread-free bore portion has a circular cross section.

6. The tool according to claim 1, wherein said thread-free bore portion is formed parallel to said threaded bore portion.

7. The tool according to claim 1, wherein said thread-free bore portion is formed coaxially with said threaded bore portion.

8. The tool according to claim 1, wherein that region of said head portion of said fastening screw that is supported on said through-hole in said exchangeable cutting insert narrows in a direction of said threaded portion.

9. The tool according to claim 1, wherein a longitudinal axis of said threaded bore portion is offset toward said lateral bearing surface with respect to a longitudinal axis of said through-hole, in a plane of contact between said head portion of said fastening screw and said through-hole in said exchangeable cutting insert.

10. The tool according to claim 1, wherein said at least one seat is formed in such a way that said exchangeable cutting insert fastened therein protrudes from said main body in an axial direction.

11. The tool according to claim 1, wherein:
said exchangeable cutting insert is one of a plurality of cutting inserts; and
said at least one seat is one of a plurality of seats, disposed spirally along the axis of rotation, for said cutting inserts.

12. The tool according to claim 11, wherein:
said exchangeable cutting insert is one of a plurality of cutting inserts; and
said at least one seat is one of a plurality of seats, disposed spirally encircling rows of said seats for said cutting inserts.

* * * * *